United States Patent [19]

Wakita et al.

[11] Patent Number: 5,085,803
[45] Date of Patent: Feb. 4, 1992

[54] METHOD OF PREPARING A CONDUCTIVE SILICONE RUBBER PARTICULATE

[75] Inventors: Haruki Wakita; Koji Shimizu; Mitsuo Hamada, all of Chiba, Japan

[73] Assignee: Dow Corning Toray Silicone Company, Ltd., Tokyo, Japan

[21] Appl. No.: 529,993

[22] Filed: May 29, 1990

[30] Foreign Application Priority Data

May 29, 1989 [JP] Japan ................... 1-135399

[51] Int. Cl.$^5$ .............................. H01B 1/24
[52] U.S. Cl. .................... 252/511; 523/200; 523/204; 523/207; 523/209; 524/588
[58] Field of Search ............... 252/511; 523/200, 207, 523/209, 204; 524/588

[56] References Cited

U.S. PATENT DOCUMENTS

| | | | |
|---|---|---|---|
| 3,706,695 | 12/1972 | Huebner | 252/511 |
| 4,145,317 | 3/1979 | Sado et al. | 252/511 |
| 4,743,670 | 5/1988 | Yoshida et al. | 528/15 |
| 4,749,765 | 6/1988 | Shimizu et al. | 528/15 |
| 4,898,689 | 2/1990 | Hamada et al. | 252/510 |
| 4,929,391 | 5/1990 | Kroupa | 252/511 |

Primary Examiner—Melvyn I. Marquis
Assistant Examiner—Karen A. Hellender
Attorney, Agent, or Firm—Edward C. Elliott

[57] ABSTRACT

A method of producing a conductive silicone rubber particulate is disclosed in which the particulate is from 0.1 to 100 micrometers average diameter and is coated on the surface with carbon black. The method prepares an aqueous dispersion of silicone rubber composition particulate, carbon black, surfactant, and water, then removes the water.

5 Claims, No Drawings

METHOD OF PREPARING A CONDUCTIVE SILICONE RUBBER PARTICULATE

BACKGROUND OF THE INVENTION

1. Field of the Invention

The present invention relates to a method for the preparation of an electrically conductive silicone rubber particulate.

2. Background Information

Methods for the production of silicone rubber powder are disclosed in U.S. Pat. Nos. 4,743,670, issued May 10, 1988, and 4,749,765, issued Jun. 7, 1988.

Electrically conductive silicone rubber particulates and methods for their preparation are known. For example, Japanese Patent Application Laid Open [Kokai] Number 63-251464 [251,464/88], equivalent to U.S. Pat. No. 4,898,689, issued Feb. 6, 1990, proposes a method which affords a conductive silicone rubber particulate. In this method, a conductive, carbon black-containing silicone rubber composition is preliminarily prepared and is then converted into particulate form by dispersion in water. It is subsequently cured by spraying into hot air to give the conductive silicone rubber particulate.

The above method requires the preliminary preparation of a conductive silicone rubber composition, which suffers from a complicated production process, and has a low productivity.

SUMMARY OF THE INVENTION

An excellent conductive silicone rubber particulate can be obtained by the surface coating of carbon black onto a silicone rubber particulate, without the preliminary preparation of a conductive silicone rubber composition followed by its conversion into particle form and curing. A mixture is prepared comprising silicone rubber particulate, carbon black, surfactant, and water. Then the water is removed from the mixture to give the conductive silicone rubber particulate.

It is an object of the present invention to introduce a novel method for the preparation of an electrically conductive silicone rubber particulate.

DESCRIPTION OF THE INVENTION

The present invention relates to a method for the preparation of a conductive silicone rubber particulate, said method consisting of the preparation of a mixture comprising (A) 100 weight parts silicone rubber particulate which does not contain an electrically conductive material with an average particle diameter of 0.1 to 100 micrometers, (B) 1.0 to 40 weight parts carbon black, (C) 0.1 to 20 weight parts surfactant, and (D) an arbitrary quantity of water, sufficient to uniformly disperse components (A), (B), and (C), and subsequently removing the water from said mixture, yielding silicone rubber particulate having the outer surface coated with carbon black.

To explain the preceding in greater detail, the silicone rubber particulate comprising component (A) has the form of a silicone rubber particulate which does not contain an electrically conductive material such as carbon black. The silicone rubber making up this component comprises those silicone rubbers known in the art, and examples in this regard are as follows: organoperoxide-curing silicone rubbers prepared by curing a vinyl-containing diorganopolysiloxane with organoperoxide; addition reaction-curing silicone rubbers prepared by the addition reaction-curing of diorganopolysiloxane having Si-bonded vinyl groups and SiH-containing organopolysiloxane in the presence of a platinum-type compound; condensation reaction-curing silicone rubbers prepared by the dehydrogenative curing of OH-terminated diorganopolysiloxane and SiH-containing organopolysiloxane in the presence of an organotin compound; and condensation reaction-curing silicone rubbers prepared by the condensation reaction between OH-terminated diorganopolysiloxane and hydrolyzable organosilane in the presence of an organotin compound or titanate ester. Within the context of the present invention, the latter two are preferred, that is, addition reaction-curing silicone rubbers and condensation reaction-curing silicone rubbers, for their ease of preparation and ease of handling.

Furthermore, the silicone rubber particulate's degree of curing is not critical for the present invention, and the silicone rubber particulate may range from the completely cured to the partially cured material.

This silicone rubber particulate comprising component (A) may be obtained by a number of methods, and its method of production again is not critical. Methods for the preparation of this silicone rubber particulate comprising component (A) are concretely exemplified as follows.

1. A liquid, addition reaction-curing silicone rubber composition is first prepared from organopolysiloxane having at least two alkenyl groups (typically vinyl) in each molecule, organohydrogenpolysiloxane having at least two silicone-bonded hydrogen atoms in each molecule, and a platinum-type compound catalyst. This composition is then introduced either into water or into surfactant-containing water, and a water-based dispersion of the liquid silicone rubber composition is generated by stirring the water or surfactant-containing water in order to disperse the silicone rubber composition into a microparticulate form. The liquid silicone rubber composition is then cured in particulate form either by curing the liquid silicone rubber composition by heating this water-based dispersion or by dispersing this dispersion into water heated to at least 25 degrees Centigrade.

2. A liquid, condensation reaction-curing silicone rubber composition is first prepared from organopolysiloxane having at least 2 hydroxyl groups at the molecular chain terminals, organohydrogenpolysiloxane having at least 3 silicon-bonded hydrogen atoms in each molecule, and an organotin catalyst. This composition is then introduced either into water or into surfactant-containing water, and a water-based dispersion of the liquid silicone rubber composition is generated by stirring the water or surfactant-containing water in order to disperse the silicone rubber composition into a microparticulate form. The liquid silicone rubber composition is then cured in particulate form either by allowing this water-based dispersion to stand as such for an extended period of time, or by heating it, or by dispersing it into water heated to at least 25 degrees Centigrade.

Further description of method for the production of silicone rubber powder is found in U.S. Pat. No. 4,743,670, issued May 10, 1988, hereby incorporated by reference to show method of producing silicone rubber particulates.

It is essential that this silicone rubber particulate have an average particle diameter of 0.1 to 100 micrometers, and values of 0.5 to 80 micrometers are preferred. When its average particle size falls below 0.1 micrometers, the carbon black does not uniformly coat the surface and in fact forms particles itself. On the other hand, when 100 micrometers is exceeded, adhesion or uptake of the carbon black on the particle surface becomes problematic.

The carbon black comprising the component (B) used by the present invention is the component which imparts electrical conductivity to the composition of the present invention. This carbon black is exemplified by furnace black, lamp black, thermal black, acetylene black, channel black, and so forth. It is essential that this component be admixed at 1.0 to 40 weight parts per 100 weight parts component (A), and values of 3.0 to 20 weight parts are preferred. A desirable electrical conductivity is not obtained at below 1.0 weight part. At values in excess of 40 weight parts, it becomes difficult to obtain a uniform mixture, i.e., a uniform dispersion, when the mixture of components (A) through (D) is prepared.

The surfactant comprising component (C) functions to bring about a uniform dispersion of the silicone rubber particulate comprising component (A) and carbon black comprising component (B) in the water. This component (C) is not particularly restricted, and consists of those surfactants and emulsifying agents known in the art for the formation of silicone oil emulsions. Such surfactants may take the form of the following nonionic, anionic, and cationic surfactants, although nonionic surfactants are preferred among these.

The nonionic surfactants are exemplified by polyoxyalkylene alkyl ethers, polyoxyalkylene alkylphenols, polyoxyalkylene alkyl esters, polyoxyalkylene sorbitan esters, polyethylene glycols, polypropylene glycols, diethylene glycol, and the ethylene oxide adducts of trimethylnonanol.

The anionic surfactants are exemplified by alkylbenzenesulfonic acids such as hexylbenzenesulfonic acid, octylbenzenesulfonic acid, decylbenzenesulfonic acid, dodecylbenzenesulfonic acid, cetylbenzenesulfonic acid, and myristylbenzenesulfonic acid; by the sulfate esters of polyoxyethylene monoalkyl ethers, such as CH3(CH2)6CH2O(C2H4O)2SO3H and CH3(CH2)8CH2O(C2H4O)8SO3H; and by alkylnaphthylsulfonic acids.

The cationic surfactants are exemplified by quaternary ammonium hydroxides such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, dioctadecyldimethylammonium hydroxide, beef tallow trimethylammonium hydroxide, and cocotrimethylammonium hydroxide, and by salts of the preceding.

The surfactant used in the present invention may take the form of only a single species, or two or more species may be used simultaneously. This component is added within the range of 0.1 to 20 weight parts per 100 weight parts component (A), and preferably within the range of 1.0 to 5 weight parts. The stability of the water-based dispersion is reduced when this addition falls below 0.1 weight part. On the other hand, the quantity of surfactant is too large in excess of 20 weight parts, and the moisture resistance of the obtained conductive silicone rubber particulate is reduced.

The water comprising the component (D) used in the present invention is the medium in which components (A) through (C) are uniformly dispersed. It should be used in that quantity necessary to bring about the uniform dispersion of components (A) through (C), and its quantity may be freely selected without particular restriction.

While the present invention consists of the formation of a mixture of the aforesaid components (A) through (D) and the subsequent removal of the water from this mixture, it is sufficient with regard to this mixture merely that components (A) through (C) are uniformly dispersed in the water, and its method of formation is not particularly specified. Methods for the preparation of this mixture are exemplified as follows. When component (A) consists of a silicone rubber particulate as such, the silicone rubber particulate comprising component (A) and carbon black may be introduced into surfactant-containing water, and the mixture is obtained simply by stirring by a known mixing means.

Moreover, when the silicone rubber particulate has been prepared in surfactant-containing water as in the aforementioned methods (1) and (2), the water-based dispersion of silicone rubber particulate afforded by such methods may be used directly as such. Carbon black is added to this water-based dispersion, and the mixture under consideration is obtained simply by mixing to homogeneity. In this case, it may prove advantageous in the production of the silicone rubber particulate to carry out the preliminary calculations of the quantity of water, quantity of silicone rubber particulate, quantity of emulsifying agent, and so forth adjusting for the status of the mixture after addition of the carbon black.

The method of production according to the present invention includes removal of water from the mixture prepared as detailed in the preceding. The water may be readily removed using known thermal dryers such as hot air-circulation ovens, spray dryers, thermal jet dryers, vacuum ovens, and so forth.

The present invention, consisting of the preparation of a mixture of (A) a specified quantity of silicone rubber particulate having an average particle size of 0.1 to 100 micrometers, (B) a specified quantity of carbon black, (C) a specified quantity of surfactant, and (D) water followed by removal of the water from this mixture, is characterized by the highly productive manufacture of an electrically conductive silicone rubber particulate.

The following examples are included for illustrative purposes only and should not be construed as limiting the invention which is properly set forth in the appended claims. All parts are parts by weight.

EXAMPLE 1

A mixture was prepared by mixing 95 parts of hydroxyl-terminated dimethylpolysiloxane having a viscosity of 100 centipoise and a hydroxyl group content of 1.3 percent, 5 parts of gamma-glycidoxypropyltrimethoxysilane, 10 parts of trimethylsiloxy-terminated methylhydrogenpolysiloxane having a viscosity of 10 centistokes and a silicon-bonded hydrogen content of 1.5 percent, and 1.0 part of dibutyltindioctoate to homogeneity. This was then transferred to a colloid mill, and a mixture of 5 parts nonionic surfactant (Tergitol TMN-6 from Union Carbide Corporation), 7 parts Denka Black (carbon black from Denki Kagaku Kabushiki Kaisha, surface area of 70 $m^2/g$), and 500 parts water was poured in at once. A water-based dispersion of the silicone rubber composition was prepared by mixing on a 0.1 mm gap at 1,400 rpm. The resulting aqueous dispersion consisted of silicone rubber composition particulate, the carbon black, the non-ionic surfactant, and water. Then, the aqueous dispersion was left to stand at temperature for 5 hours. The resulting aqueous dispersion consisted of silicone rubber particulate with an average particle diameter of 10 micrometers, carbon black, the nonionic surfactant and water. Next, this aqueous dispersion was sprayed into hot air. Thus, water was eliminated, and hardening of the silicone rubber particulate was completed, resulting in an electroconductive silicone rubber particulate with average particle diameter of 10 micrometers.

A silicone rubber stock was then prepared by mixing 20 parts fumed silica to homogeneity with 100 parts dimethylvinylsiloxy-terminated dimethylpolysiloxane gum. Into 100 parts of this silicone rubber stock were compounded 200 parts of the conductive silicone rubber particulate prepared as above and then 9 parts of 2,5-dimethyl-2,5-di(t-butylperoxy)hexane, and this was mixed to homogeneity. This mixture was subsequently press vulcanized at 170 degrees Centigrade for a heating time of 10 minutes to afford a 2 mm-thick silicone rubber sheet. The surface resistance was measured at 10 points on this silicone rubber sheet: the average measured value was $5 \times 10^7$ ohm, while the range of variation was $1 \times 10^7$ to $9 \times 10^7$ ohm.

EXAMPLE 2

The following were passed through a static mixer and mixed to homogeneity: 100 parts of dimethylvinylsiloxy-terminated dimethylpolysiloxane (viscosity of 500 centipoise and vinyl group content of 0.5 percent), 3 parts of trimethylsiloxy-terminated methylhydrogenpolysiloxane (viscosity of 10 centipoise and silicon-bonded hydrogen content of 1.5 percent), and 0.6 parts of isopropanolic chloroplatinic acid solution (platinum content of 3 percent). This mixture was then sprayed into a spray dryer having an inlet temperature of 300 degrees Centigrade and an outlet temperature of 110 degrees Centigrade and was cured during spraying. The product was a silicone rubber particulate with an average particle diameter of 20 micrometers.

Then 100 parts of this silicone rubber particulate, 10 parts of Denka Black (surface area of 70 $m^2/g$), 5 parts of anionic surfactant (Demol EP from Kao Kabushiki Kaisha), and 500 parts water were mixed to homogeneity in a mixer. This was dried as in Example 1 to afford a conductive silicone rubber particulate, 150 parts of which was blended into 100 parts silicone rubber stock prepared as in Example 1. A silicone rubber sheet was molded proceeding as in Example 1 from then on. The surface resistance of this silicone rubber sheet and the range of variation in these values were determined as in Example 1: the average value was $5 \times 10^4$ ohm, and the range of variation was $2 \times 10^4$ to $4 \times 10^4$ ohm.

That which is claimed is:

1. A method for the preparation of conductive silicone rubber particulate, consisting of the preparation of a mixture comprising
   (A) 100 weight parts silicone rubber particulate which does not contain an electrically conductive material with an average particle diameter of 0.1 to 100 micrometers,
   (B) 1.0 to 40 weight parts carbon black,
   (C) 0.1 to 20 weight parts surfactant, and
   (D) an arbitrary quantity of water, sufficient to uniformly disperse components (A), (B), and (C),
   and then removing the water from said mixture, yielding silicone rubber particulate having the outer surface coated with carbon black.

2. The method of claim 1 in which the average particle diameter of (A) is from 0.5 to 80 micrometers.

3. The method of claim 1 in which the carbon black (B) is present in an amount of from 3 to 20 weight parts.

4. The method of claim 1 in which the surfactant (C) is a nonionic surfactant, present within the range of 1 to 5 weight parts.

5. The conductive silicone rubber particulate produced by the method of claim 1.

* * * * *